(12) United States Patent
Rosenthal

(10) Patent No.: US 6,337,747 B1
(45) Date of Patent: *Jan. 8, 2002

(54) SYSTEM TO ADAPTIVELY COMPRESS RASTER IMAGE DATA

(75) Inventor: Hanan Rosenthal, Sunnyvale, CA (US)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/015,346

(22) Filed: Jan. 29, 1998

(51) Int. Cl.$^7$ ................................................ G06K 15/00
(52) U.S. Cl. ....................................... 358/1.15; 358/1.17
(58) Field of Search ................................. 395/112, 114, 395/115, 116; 358/261.2, 430, 261.4, 426, 261.1, 1.13, 1.15, 1.16, 1.17, 1.1; 382/239, 238, 244, 246, 232, 245, 247; 348/410, 409, 401, 410.1, 409.1, 401.1; 341/50, 51

(56) References Cited

U.S. PATENT DOCUMENTS

| | | | | |
|---|---|---|---|---|
| 5,341,442 A | * | 8/1994 | Barrett | 382/166 |
| 5,479,587 A | | 12/1995 | Campbell et al. | 395/116 |
| 5,539,865 A | | 7/1996 | Gentile | 395/115 |
| 5,544,290 A | * | 8/1996 | Gentile | 358/1.15 |
| 5,552,898 A | | 9/1996 | Deschuytere | 358/426 |
| 5,553,160 A | * | 9/1996 | Dawson | 358/430 |
| 5,602,976 A | * | 2/1997 | Cooper et al. | 358/1.15 |
| 5,611,024 A | | 3/1997 | Campbell et al. | 395/114 |
| 5,832,490 A | * | 11/1998 | Riley | 707/101 |
| 6,009,192 A | * | 12/1999 | Klassen et al. | 382/167 |

OTHER PUBLICATIONS

Mano, Morris M., Computer Systems Architecture, 3rd edition, 1993, pp. 78–79.*
A. W. Paeth, "Image File Compression Made Easy,", from *Graphics Gems II*, edited by J. Arvo, 1991, pp. 93–100.

* cited by examiner

Primary Examiner—Dov Popovici
(74) Attorney, Agent, or Firm—Fitzpatrick, Cella, Harper & Scinto (57) ABSTRACT

A system for compressing raster image data comprised of M (M>1) bands to a compression ratio of at least C:1, each band being comprised of a plurality of pixels each having a pixel value, which includes compression of N ($1 \leq N < M$) bands of the raster image data using a lossless compression technique, calculation of a compression ratio for the compressed N bands of raster image data, determination of whether the calculated compression ratio is at least C':1, wherein C' is less than C, and, following the compression of the N bands, compression of a remaining (M–N) bands of the raster image data using the lossless compression technique if it is determined that the calculated compression ratio is at least C':1, wherein the remaining bands are rendered after the first compressing step and each band of raster image data is compressed prior to rendering a next band and, wherein if it is determined that the calculated compression ratio is less than the C':1, the raster image data is compressed to a compression ratio of at least C:1 using a lossy compression technique.

12 Claims, 7 Drawing Sheets

SYSTEM TO ADAPTIVELY COMPRESS RASTER IMAGE DATA

BACKGROUND OF THE INVENTION

1. Field of the Invention

The present invention is directed to a system for improving the efficiency and quality of digital image compression systems that are used in printing and other image processing systems.

2. Description of the Related Art

Current laser beam printer engines found inside printers, copiers, fax machines, multifunctional equipment and other imaging systems are capable of printing high resolution image data at high speeds. For such a printer engine, the motion of the engine must be uninterrupted and a data stream must be provided to the engine at a high rate at precise timings (within a few nanoseconds) from the moment the printer engine picks up a sheet of paper (or a similar medium) and until the sheet is ejected with all the information properly printed on it. Since typical pixel data flows to the printer engine at a rate of tens of millions of pixels per second, there is very little time for on-the-fly computations.

One method for providing such a data stream to a printer engine requires complete preparation and storage of a full page of rasterized image data prior to commencing any printing. Such a method usually requires a large amount of memory.

Recently-introduced high-speed printers are capable of printing high-resolution images in multi-level grayscale or in multi-level color. In multi-level grayscale printing, for example, an 8-bit value is used to represent each pixel on a page. Accordingly, approximately 30,000,000 bytes of memory are required in order to store a full 8 ½" by 11" 8-bit grayscale image to be printed at 600 dots per inch (dpi). A multi-level color image of the same size and density requires four times as much memory, approximately 120,000,000 bytes, in order to store, for each pixel, 8-bit values corresponding to each of the cyan, magenta, yellow, and black components. For these images, a large amount of memory is needed if the image data for an entire page were rasterized prior to commencing printing. This incurs high costs that are commercially unacceptable in many markets.

In order to reduce the amount of memory required to store a page of image data to be printed and to maintain an uninterrupted stream of image data to a printer engine, a banding and compression technique has been suggested whereby the page is partitioned into parallel bands. Prior to printing, each band is rasterized using a rasterized band memory, compressed and stored in compressed form. The rasterized band memory is then released for re-use and subsequent bands are processed similarly. During printing, each processed band is decompressed back into rasterized image data "on the fly" as the page is being printed.

The above technique requires: 1) A compression method which practically guarantees a minimum compression ratio, so as to be certain that a page of compressed image data bands will fit within a storage area of predesignated size, and 2) a decompression algorithm sufficiently fast to produce decompressed image data from the bands at the high rates required by laser beam printer engines.

Various compression techniques have been proposed to meet the above requirements. For example, lossless compression techniques such as Huffman, run-length, and Lempel-Ziv-Walsh (LZW) typically provide fast decompression, but these techniques cannot guarantee a particular compression ratio. Furthermore, although these techniques produce good compression ratios for binary images, such as text and black-only graphics images, lossless techniques often provide poor compression ratios when applied to multi-level images, particularly scanned color images.

In the event that lossless techniques fail to yield a required compression ratio, supplementary lossy compression techniques may be used.

JPEG compression, for example, can provide guaranteed minimum compression ratios, such as 10:1 or higher. However, image distortion due to JPEG processing tends to increase along with required compression ratios. If a required compression ratio is not too high (8:1 or less), image degradation is often unnoticeable for some multi-level images, such as natural photographs. However, JPEG compression blurs sharp edges, thereby significantly affecting the quality of text and graphics images.

Accordingly, what is needed is an improved lossless compression technique which provides acceptable (e.g., 4:1) compression ratios for a vast majority of possible input images and thereby reduces reliance on less-desirable lossy compression to a negligible minority of possible input images. Such an improved compression technique must also provide fast decompression so that print data is continuously provided to a printer engine during printing.

One improvement to lossless compression techniques is described in "Graphics Gems II", edited by James Arvo, pages 93 to 100, Academic Press Inc., 1991 (the "Holt-Roberts Method"). The Holt-Roberts method is a two dimensional predictor-corrector technique which takes advantage of the similarity between neighboring pixels of high resolution images in order to convert the relatively flat statistics of an input image to statistics of differences (correctors), which are concentrated around zero and can therefore be compressed more effectively than the input image. Using the Holt-Roberts Method, an image is pre-processed by using a predictor algorithm to calculate a predictor value corresponding to each pixel of the image. For each predictor value, a corrector value is calculated based on the difference between the predictor value and its corresponding image pixel. The corrector values are stored in a corrector file which, in conjunction with the predictor algorithm, is completely descriptive or the original image file. The actual values of the predictor need not be stored. The corrector file is then subject to lossless compression.

If an effective predictor algorithm is used, many of the corrector values will be equal to zero or in the vicinity of zero. Advantageously, conventional lossless compression techniques such as Lempel-Ziv-Walsh or Huffman compression are most effective in achieving high compression ratios when compressing data having such an uneven statistical distribution. Accordingly, compression ratios achieved by applying lossless compression to the corrector obtained from predictor-corrector pre-processing of an image are significantly greater than those achieved by applying lossless compression directly to the original image.

However, while trying to realize the above method, Applicant encountered a problem inherent in practical implementations of predictor-corrector compression techniques. Applicant has discovered that implementation of Holt-Roberts usually results in a corrector file that is significantly larger then a corresponding original image file. The reason for this phenomenon is as follows. When applied to original image data having 8-bit pixel values ranging from 0 to 255, a predictor algorithm may, for example, produce predicted values also ranging from 0 to 255. Corresponding corrector values are calculated using the simple formula: corrector value =original image value−predictor value. Accordingly, the range of possible corrector values is twice the range of the original image values, namely −255 to 255.

It should be noted the corrector may be positive or negative, so a sign bit is also required. As a result, whereas each original pixel value could be stored using one 8-bit sequence, storage of each corrector value in the above example requires up to ten bits. Other predictor algorithms may require even more bits per corrector value.

Most digital processing equipment is constructed to operate on data organized into 8-bit bytes. Therefore, in order to represent a corrector value requiring ten bits or more, it is generally contemplated to reserve two bytes of eight bits each. Such a corrector file can be twice as large as an original eight bits per pixel image file which it represents. As a result, any improvements in compression ratio due to the uneven statistical distribution of the corrector file will be diminished or eliminated by the expansion of the original file during pre-processing.

Accordingly, the conventional Holt-Roberts method does not provide both acceptable net compression ratios and fast decompression and delivery of print data to a printer engine.

SUMMARY OF THE INVENTION

The present invention addresses the foregoing problems by creating an intermingled corrector file including both corrector values and actual pixel values preceded by a special flag character. The pixel value/flag character pairs replace those corrector values that would require too many bits of storage memory, thus preserving the size of a corrector file storage memory at the cost of adding relatively few flag characters to a corrector file. As a result, if eight bits are required to represent actual image values, each value in the intermingled corrector file can be represented using eight bits as well. The intermingled corrector file is then compressed, thereby allowing the Holt-Roberts improvements in compression ratio to manifest themselves.

Thus, in one embodiment of the invention, raster image data including a number of pixels is pre-processed by calculating a predictor value of a target pixel, and by calculating a corrector value for the target pixel based on a difference between the predictor value of the pixel and on the pixel value. The corrector is stored in a memory in a case that: the corrector falls within a predetermined range. In a case that the corrector value falls outside the predetermined range, a flag character, followed by the pixel value of the target pixel, is stored in the memory. Finally, all data stored in the memory is compressed using a lossless compression technique.

By virtue of the foregoing arrangement, a predictor-corrector method of processing original image data prior to lossless compression can be implemented using a same bit-length group as that used to represent pixel values of the original image data, without creating a significant initial increase in the amount of data subsequently subjected to lossless compression. For example, Applicant has empirically measured initial inflation due to the insertion of flag characters on several images of various sources and contents and found that the inflation was less than 2% for computer-generated graphics and text, and less than 0.5% for scanned photographs. The overall compression ratio was better than 4:1 on almost all input images tested, and better than 8:1 on all computer-generated graphics and texts that were sampled.

According to a further aspect, it is determined whether to use lossless compression or to resort to lossy fall-back compression methods based on actual compression ratios achieved on a band-by-band basis. In particular, after a predetermined portion of a page has been processed, the compression ratio for the full page is predicted. The prediction can be based, for example, on the compression ratio of the portion of the page as well as other factors. If the predicted compression ratio is greater than a predetermined threshold, lossless processing continues. Otherwise, the lossless processing is abandoned and the page is processed using fall-back lossy compression.

Thus, in one embodiment of the invention, after approximately 25% of the page has been losslessly processed, the accumulated compression ratio is compared to a threshold of 3:1. If equal or greater, lossless processing continues until approximately 50% of the page is processed. At this point, an accumulated compression ratio of 3.5:1 or better is required in order to proceed. Another comparison is made at the 75% mark against a target compression ratio of 4:1. A final comparison is made near the end of the page to determine whether the processing and compression was completed successfully. If the compression fails due to lack of storage space or if the predicted compression ratio is lower than the threshold at any comparison point, lossless processing is abandoned and the page is re-processed using a lossy scheme (e.g., JPEG) with a guaranteed minimum compression ratio.

In a different embodiment, a predicted compression ratio is compared with a target ratio after each band has been processed.

Accordingly, the present invention provides a high quality (usually lossless) image compression and decompression subsystem for use in printing systems and other imaging applications.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENTS

Figure 1:
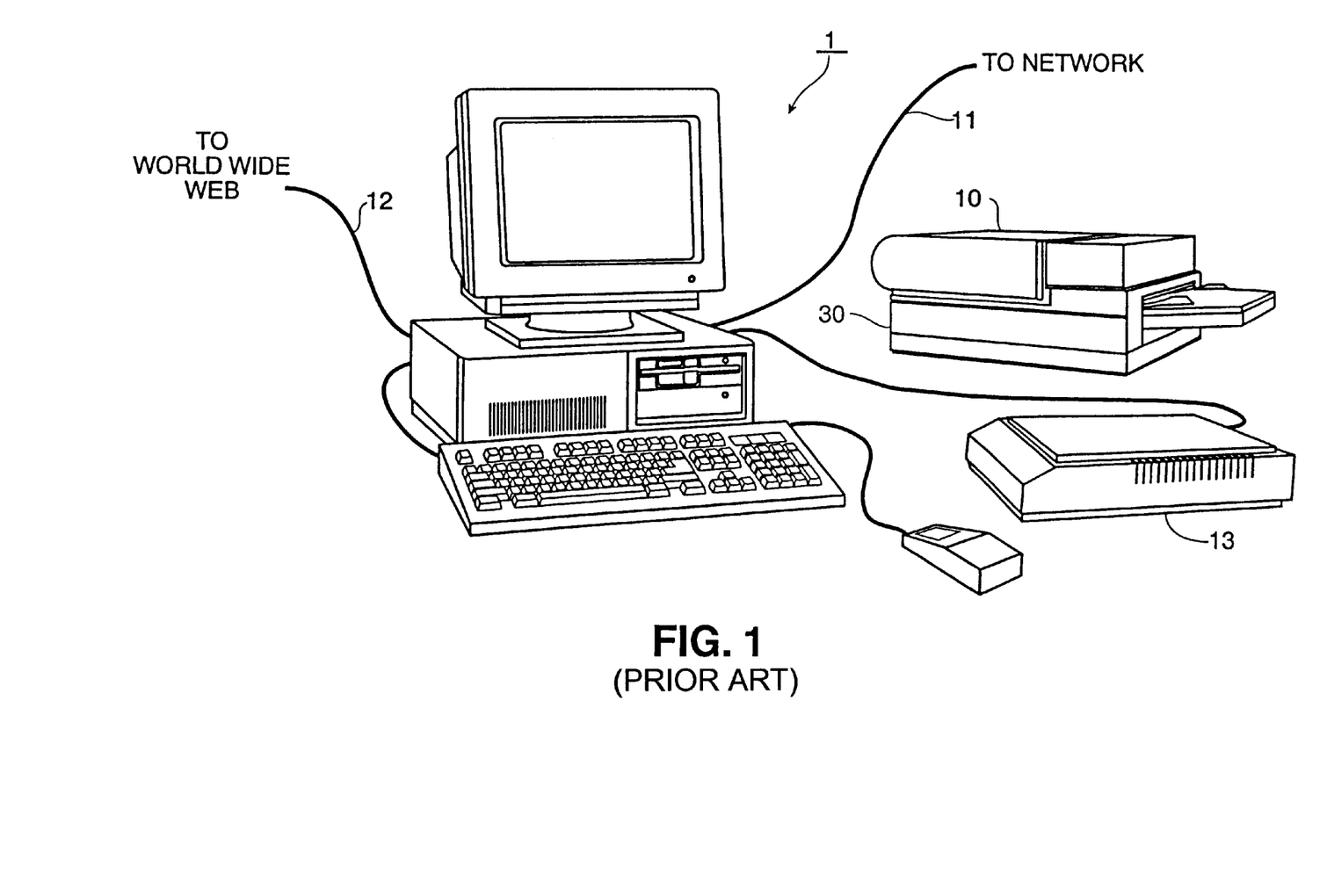
FIG. 1 is a representative view of a computing system implementing the present invention.

FIG. 1 shows representative computing equipment which implements an image compression system according to the present invention. Shown in FIG. 1 is computer 1, such as an IBM PC or PC-compatible computer having a standard operating system such as the Microsoft Windows™ operating system.

Laser beam printer 10 is provided to print images on command from computing system 1. As described above, the present invention provides significant benefits when used in conjunction with multi-level output, high-speed printers, however, any system requiring image compression will benefit from the present invention. Preferably, laser beam printer 10 is connected to a Local Area Network (LAN) (not shown) through which laser beam printer 10 can be accessed by other computing systems connected to the LAN.

Printer controller 30 is a special processing unit that resides inside or near laser beam printer 10. Printer controller 30 is connected to a network and translates incoming printing information, expressed normally in a page description language (PDL) or in an intermediate display list format, to raster image pixel data. In a preferred embodiment, most of the process steps of the present invention are executed inside printer controller 30.

Also provided with computing equipment 1 are network connection 11 and World Wide Web (hereafter WWW) connection 12, which may consist of an ordinary telephone line, an ISDN connection, or the like. Image files may be received or transmitted via network connection 11 or WWW connection 12. Moreover, computer-executable process steps used to implement the present invention may be received over network connection 11 or WWW connection 12.

Image files may also be input to computing system 1 via scanner 13, which may be a flatbed or other type of scanner.

In operation, and under control of computer 1's operating system, stored application programs such as graphics application programs, drawing application programs, desktop publishing application programs, and the like are selectively activated to process, to manipulate, and to display image data. In accordance with operator instructions, and in conjunction with the stored application programs, commands are issued to print image data displayed on display screen 2 or residing in a stored image file. In order to do so, the application programs call a special printer driver program that places information to be printed in a PDL format and sends the information to printer 10 over a network.

Figure 2:
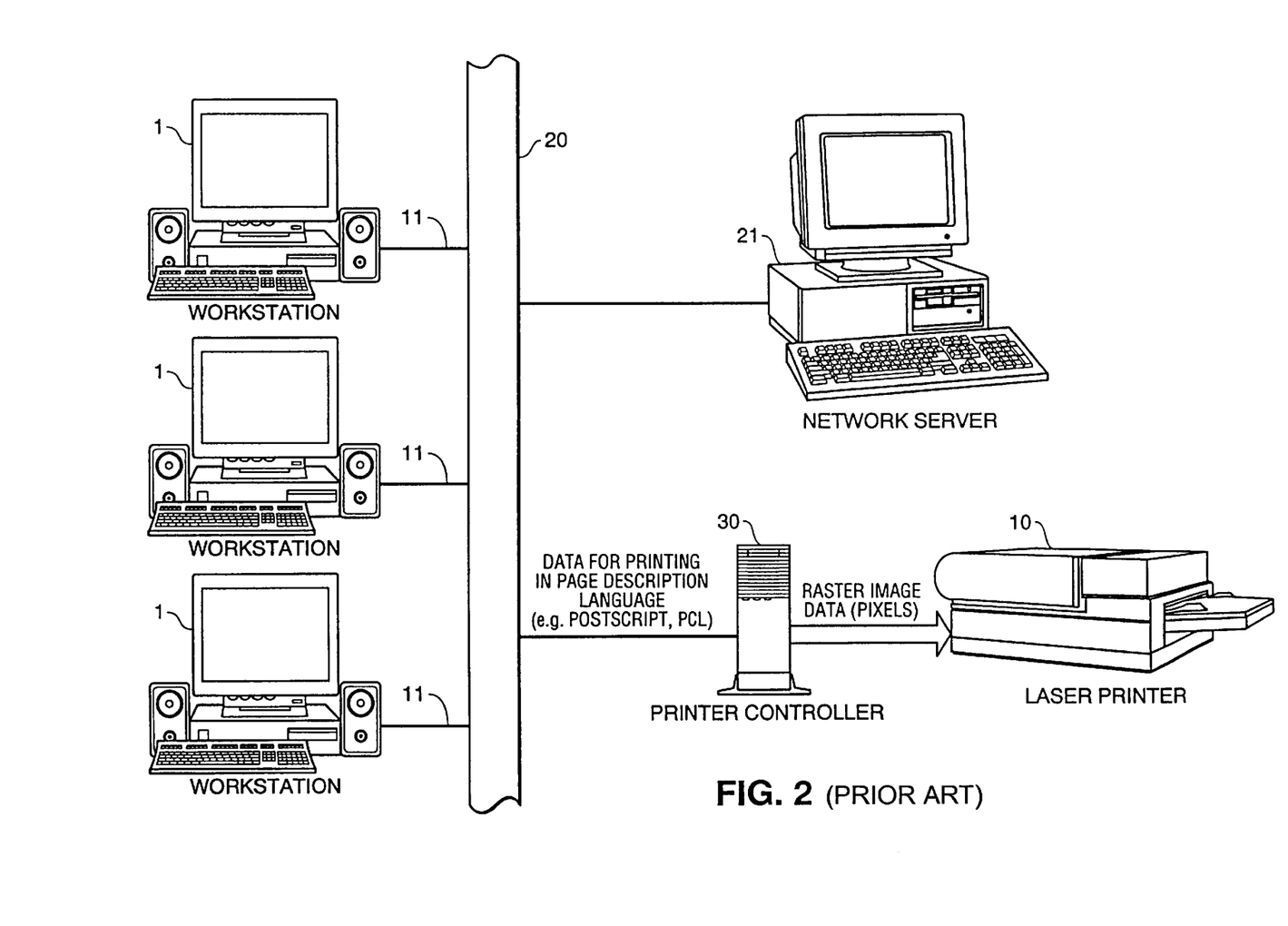
FIG. 2 is a block diagram of a sample network architecture implementing the present invention.

FIG. 2 is a block diagram of a computer network in which resides an imaging system implementing the invention. Workstations similar to computer 1 are connected to network 20 using network connections 11. Network server 21 (there may be several network servers) controls the traffic of data over the network, including printing information sent to printer controller 30 in order to be printed on laser beam printer 10.

As previously explained, each workstation 1 runs application programs which use printer driver programs to create PDL data whenever printing is required. The printer driver programs are also responsible to direct the created PDL data to printer controller 30 by inserting a network address of printer controller 30 into data packets that are thereafter sent over network 20.

Network server 21 stores the addresses of every port of network 20. Accordingly, in a case that printing information in the form of PDL data is sent for printing by printer 10, server 21 opens a log entry corresponding to printer controller 30. If printer controller 30 is busy processing other print jobs, server 21 may save the information in one of its internal queues for later transmission.

Printer controller 30 is responsible for receiving printing information sent over network 20 (or other interface ports such as a parallel port, an Infra-Red port, a Universal Serial Bus port, etc.), and translating it into timely pixel streams for printer 10. Printer controller 30 may or may not have the ability to queue print jobs.

In most embodiments, printer controller 30 is responsible for executing the process steps according to the present invention. In the preferred embodiment, decompression, reconstruction and sending pixels to printer engine 10 are always done by printer controller 30. However, in other embodiments, some process steps may be executed by other parts of the system such as network server 21 or workstations 1.

Figure 3:
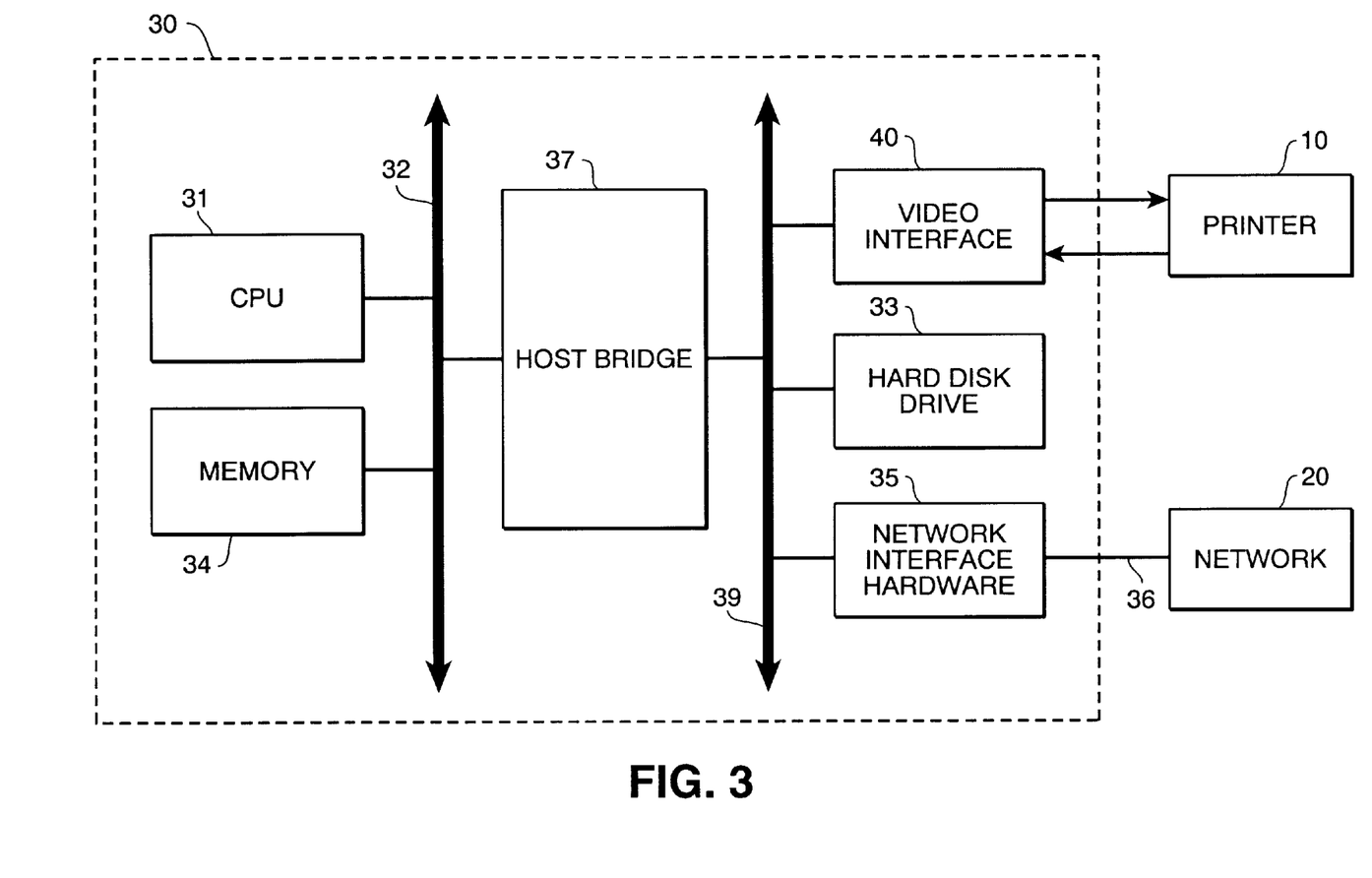
FIG. 3 is a block diagram of the internal architecture of a network printer controller implementing the present invention.

FIG. 3 is a detailed block diagram showing the internal functional structure of a preferred embodiment of printer controller 30. As mentioned before, printer controller 30 may be physically located inside the framework of printer 10 or outside it.

Within printer controller 30, network interface 35 is connected to network 20. Network interface 35 transmits and receives information, translating the information to and from formats specified by the network protocol. Network interface 35 is preferably connected to high speed Input/Output (I/O) bus 39. In a preferred embodiment, I/O bus 39 can be the Peripheral Component Interconnect (PCI) bus or a similar bus. Local hard disk 33 is preferably connected to I/O bus 39. Hard disk 33 stores, among other types of information, program instruction sequences that include instructions to compress rasterized data according to the present invention.

I/O bus 39 is connected to host bus 32 by the host bridge 37. Host bus 32 is built according to the specifications of CPU 31, and normally allows the fastest and widest data transfers inside printer controller 30, particularly between CPU 31 and memory 34.

Memory 34 consists of ROM and RAM portions. The ROM portion stores program instructions for execution by Host CPU 31. These instructions typically involve initiating the system and loading the program instruction sequences from the local hard disk 33 to the RAM portion in order to be executed later by Host CPU 31. The ROM portion of memory 34 may also include program instruction sequences that perform page processing, compression and decompression according to the present invention. The major part of the RAM portion of memory 34 holds pixel data of raster images, which are usually in compressed form in accordance with the present invention.

It should be noted that, in other embodiments, one bus serves both as a host bus and an I/O bus, and in yet another embodiment more than two busses are located within printer controller 30.

It should also be noted that local busses inside components such as network interface 35 or video interface 40 are not shown in FIG. 3.

Video interface 40 is preferably connected to I/O bus 39. Video interface 40 includes a printer engine interface, pixel reconstruction hardware and decompression co-processing hardware. In the preferred embodiment of the invention, video interface 40 also includes a compression co-processor. It should be noted that in other embodiments compression can be performed by special-purpose hardware connected to I/O bus 39 or host bus 32. Compression can also be performed according to software running on CPU 31. Decompression and reconstruction can also be performed by various systems according to other, less preferred embodiments.

Figure 4:
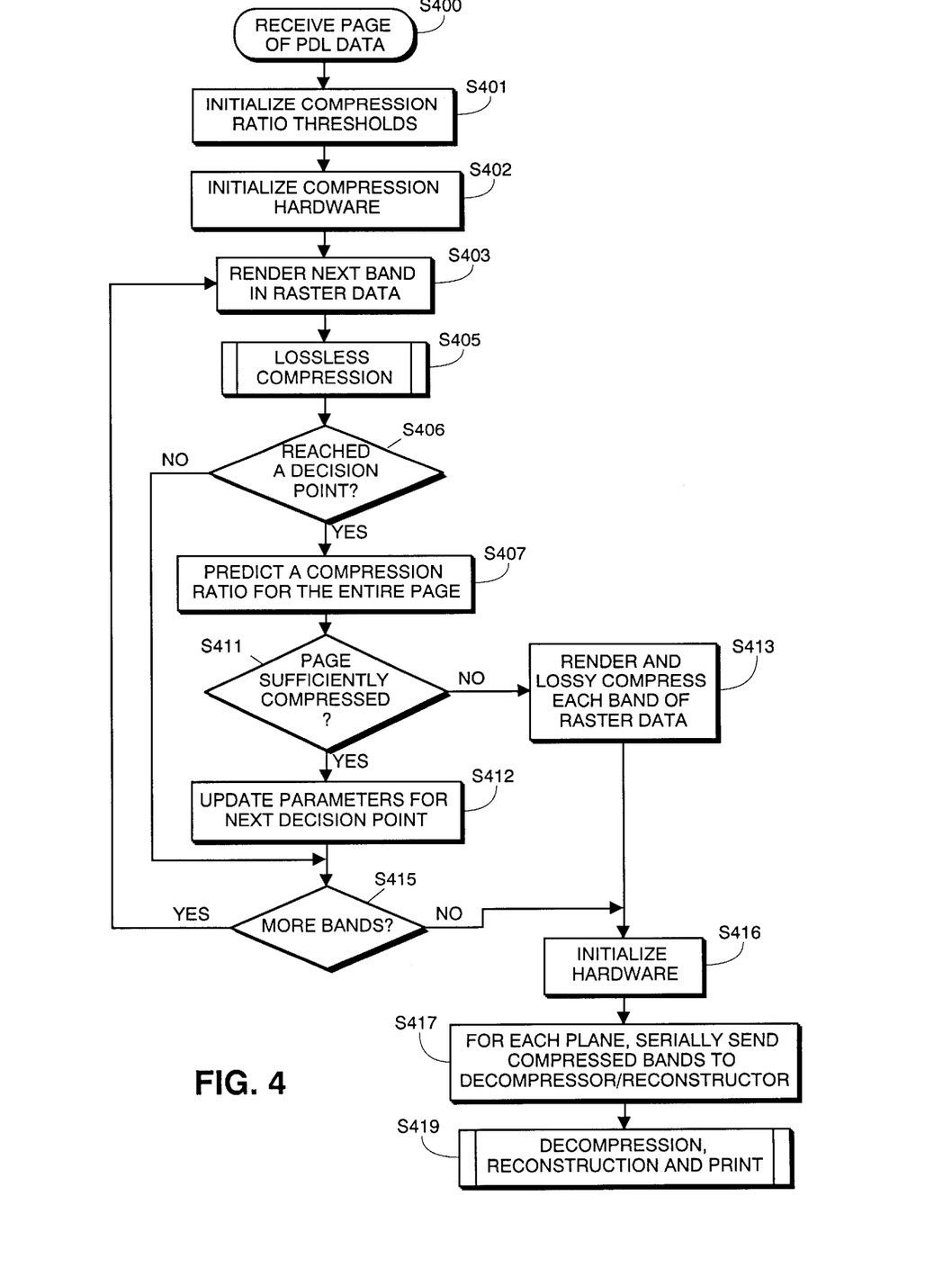
FIG. 4 is a flow diagram describing a method for compressing image data prior to printing according to the present invention.

FIG. 4 is a flow diagram for describing the operation of controller 30. Generally, a page of data to be printed is received in a PDL format, controller 30 renders data corresponding to each band of the page into a rasterized format, compresses the rasterized bands into compressed corrector files according to the present invention, decompresses the rasterized bands, and outputs raster image data to printer 10.

More specifically, in step S400, a page of data to be printed is received, in a PDL format, by controller 30 and stored in hard disk 33 and/or in the RAM portion of memory 34. Next, in step S401, thresholds corresponding to various decision points within the page are initialized. At each decision point, a predicted compression ratio for the page is compared to a threshold corresponding to the decision point, as described with respect to steps S406, S407 and S411. In step S402, compression hardware is initialized.

In step S403, a band of the received PDL data is rendered into rasterized data. The rasterized data is also stored in the RAM portion of memory 34. Step S405 processes the band of rasterized data according to the lossless compression scheme of the present invention, so as to produce a losslessly-compressed intermingled corrector file, which is stored in memory 34. Production of a losslessly-compressed intermingled corrector file in step S405 will be described in detail below with respect to FIG. 5.

Once the band is compressed, control proceeds to step S406. In step S406, the quantity of pixels processed so far is compared to the decision points described with respect to step S401 in order to determine whether a decision point has been reached. If a decision point (e.g. 25% of the page or 45% of the page) has been reached, flow proceeds to step S407. Otherwise, flow proceeds to step S415. In step S407, a net compression ratio for the entire page of image data is predicted. The prediction can be based on various factors, such as the size of the incoming PDL file, but the preferred prediction is equal to the actual compression ratio accumulated to this point. The accumulated compression ratio is equal to the ratio of the cumulative size of all rendered bands of rasterized data to the cumulative size of compressed intermingled corrector files so far generated.

Step S411 determines, using the prediction calculated in step S407, whether the page is going to be sufficiently compressed. If the predicted compression ratio for the page is greater than the threshold corresponding to the current decision point, flow proceeds to step S415. On the other hand, if the predicted ratio is below the threshold, flow proceeds to step S413. For example, one preferred embodiment of the invention requires a ratio of at least 4:1 at the 50% decision point in order to proceed to step S412.

In step S412, the parameters of the next decision point are updated. These parameters consist of where in the page the next decision point is located and the threshold compression ratio corresponding to the next decision point. Control then proceeds to step S415.

At step S415, CPU 31 determines if more bands of the page exist. If so, flow returns to step S403 in order to store additional losslessly-compressed intermingled files to memory 34 or, alternatively, to perform lossy compression on an entire page of rasterized data. If there are no more bands to process, flow proceeds to step S416.

In step S413, which is executed in the event an insufficient compression ratio is predicted or obtained, each band of PDL image data received in step S400 is rendered in a rasterized format and subjected to lossy compression, such as JPEG compression, in order to achieve a desired compression ratio. This procedure assures that an entire page of compressed and easily-decompressable image data can be stored within the RAM portion of memory 34 for uninterrupted delivery to printer 10. Advantageously, most images for which the above flow reaches step S413 are photograph-type images, which are not always greatly affected by image degradation caused by lossy compression/decompression of sufficiently low ratio. Flow then advances from step S413 to step S416.

It should be understood that, for color images, image data exists in multiple color planes, such as one plane each for cyan, magenta, yellow, and black colorants or toner. Accordingly, in a case of a color image, steps S400 to steps S415 are performed for each plane of image data.

In step S416, decompression/reconstruction hardware is initialized. In the preferred embodiment, video interface 40 performs decompression/reconstruction and is therefore initialized in step S416. Next, in step S417, compressed files of image data corresponding to a single plane of the image data are serially sent to video interface 40, followed by compressed files corresponding to each other plane. It should be noted that the compressed files sent to video interface 40 in step S417 are either losslessly-compressed intermingled corrector files or lossy-compressed bands of rasterized image data.

In step S419, a compressed band is decompressed and original pixels are reconstructed, in order to produce pixels of rasterized image data. Step S419 will be described in greater detail below with respect to FIG. 7. The pixels are sent to printer 10 in a timely fashion for printing.

In this regard, it is noted that, at step S400 of the FIG. 4 flow, image data exists in PDL format within memory 34. However, PDL format cannot ordinarily be rendered quickly enough into rasterized data to be delivered to printer 10 at the required rate.

Figure 5:
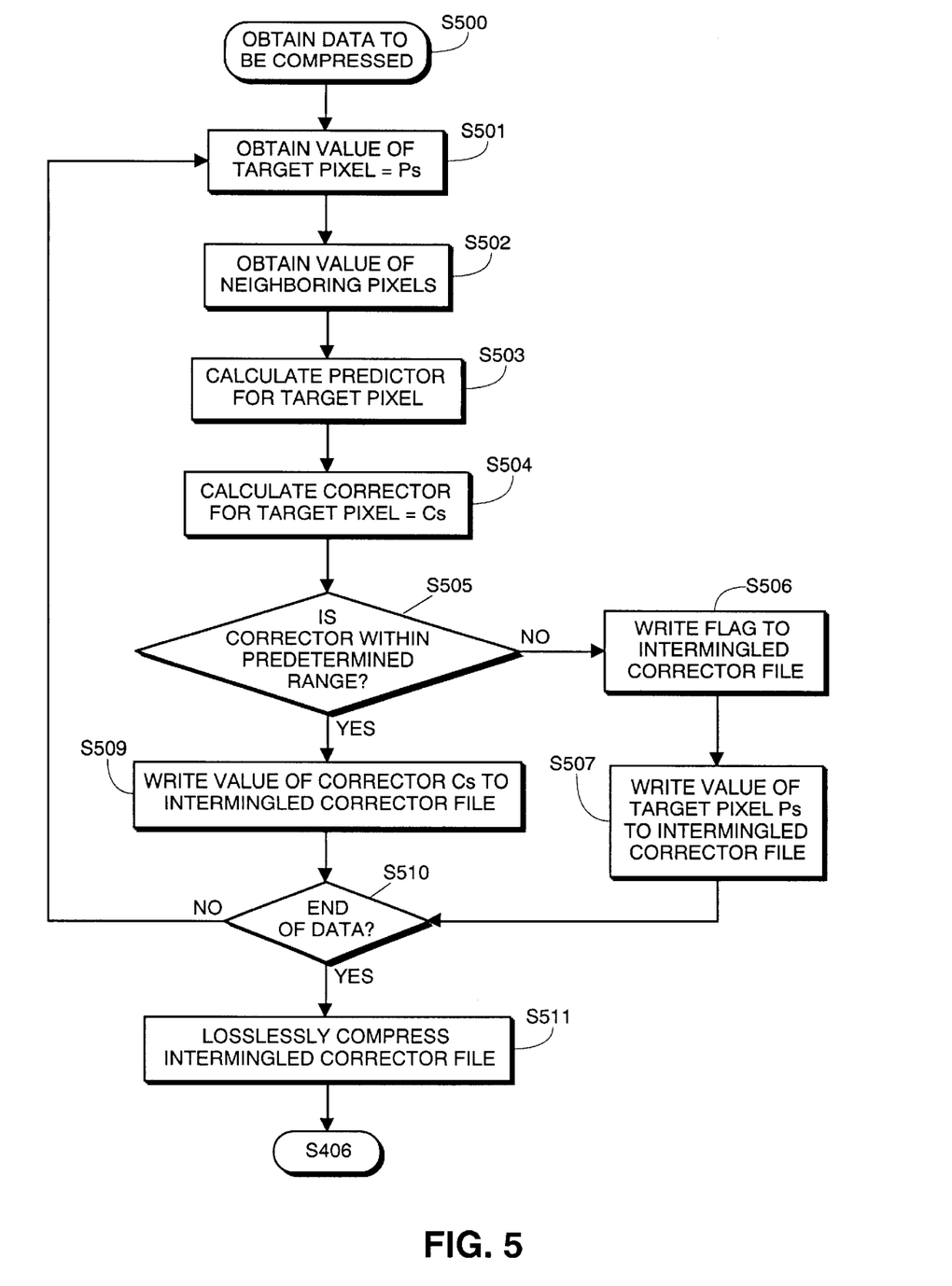
FIG. 5 is a flow diagram describing a process for losslessly compressing an image file in accordance with the present invention.

FIG. 5 is a detailed flow diagram for describing step S405 of FIG. 4. The input to step S405 is generally a band of image data consisting of pixels arranged in lines, or rasters. In this step, a predictor value is calculated for each pixel, then a corrector value (normally<corrector value>=<actual pixel value>−<predictor value>) is generated. If this corrector value falls within a predetermined range, the corrector value is saved in an intermingled corrector file. If, on the other hand, the corrector value falls outside the pre-determined range, a special flag character is stored, followed by the original pixel value, in the intermingled corrector file. Finally, when all input pixels have been processed, the intermingled file is losslessly compressed.

Particularly, flow begins at step S500, where a rasterized band of image data is obtained. In step S501, a value of a target pixel from the rasterized band is obtained. Next, in step S502, the values of the neighboring pixels (left, upper and upper-left), that were previously reconstructed and saved, are obtained. In step S503, a predictor value for the target pixel is determined.

Any deterministic predictor algorithm may be used to determine a predictor value in step S503. However, the predictor algorithm used in step S503 must be identical to that used in step S410 to subsequently reconstruct an intermingled corrector file produced by the FIG. 5 flow.

It should also be understood that compression ratios achieved by the present invention are affected by the accuracy with which the predictor algorithm predicts values of target pixels. However, printer throughput is inversely related to the computational complexity of the predictor algorithm. Therefore, benefits achieved by an extremely accurate predictor algorithm may be outweighed by slow file reconstruction caused by computational complexity of the algorithm. Therefore, predictor algorithms should be simple and easy to implement.

In the preferred embodiment, the predictor value is obtained by summing the values of the pixels directly to the left and directly above the target pixel, and by subtracting the value of the pixel directly adjacent to the upper left of the target pixel. In equation form, the predictor is; $PR_s=U+L-UL$, where $PR_s$ is the predictor value, U is a value of the pixel directly above the target pixel, L is a value of the pixel directly to the left of the target pixel, and UL is a value of the pixel directly adjacent to the upper left of the target pixel.

In step S504, a corrector value corresponding to the target pixel is calculated. In the preferred embodiment, the corrector value is calculated by subtracting the predictor value calculated in step S502 from the target pixel value obtained in step S501, as follows: $C_s=P_s-PR_s$, where $C_s$ is the corrector value, $P_s$ is a value of the target pixel, and $PR_s$ is the predictor value.

Next, in step S505, the corrector value is examined to determine whether it falls within a predetermined range. In this regard, prior to creating the intermingled file, a range of corrector values is selected. The range is selected such that each corrector value inside the range can be represented by a same or smaller number of bits as that used to represent the image pixel values. In addition, the range is specified such that there is at least one value that falls outside the range but that can be represented by the same number of bits. Such values can be used as flag characters.

For example, if pixel data normally occupy m bits, they are usually stored as unsigned (non-negative) quantities in the range of $-(2^{m-1}-1)$ to $+(2^{m-1}-1)$ with the value $-2^{m-1}$ as the flag character. Advantageously, values inside this range as well as the flag character can all be represented by m bits. Many imaging and computer systems use m values of 4, 8, 16, 24, 32, 36 or 64 bits per unit of storage, but the method is applicable to any size of unit of storage on any computer-readable memory or other storage medium. In particular, if the imaging system uses eight bits to store each pixel data, a good range of corrector values can be $-(2^7-1)$ to $+(2^7-1)$, or $-127$ to $+127$, with the flag value being $-2^7$, or $-128$. These corrector, flag and original pixel values can all be stored in regular eight bit storage units (bytes).

Since 8-bit signed values are used in the preferred embodiment to represent corrector values, the predetermined range in the preferred embodiment is $-(2^7-1)$ to $+(2^7-1)$, or $-127$ to $127$, inclusive. Significantly, this range contains 255 values, one value less than can be represented using eight bits. Accordingly, the remaining 8-bit value, $-(2^7)$ or $-128$, is used as a flag character in step S506. The flag is used to signal the reconstructor hardware that the next value in the intermingled corrector file is an actual image pixel value, rather than a corrector value. Of course, other predetermined ranges and corresponding flag characters can be used in practicing the present invention, as long as the flag character used in step S506 is identical to that searched for during image data reconstruction, as described below.

If it is determined in step S505 that the corrector value is not within the predetermined range, flow proceeds to step S506, in which the flag character ($-128$ in the current example) is written to an intermingled corrector file corresponding to the band obtained in step S500. Next, in step S507, the actual value of the target pixel obtained in step S501 is output to the intermingled corrector file, and the corrector value is discarded. Flow then proceeds to step S510.

On the other hand, if it is determined in step S505 that the corrector value is within the predetermined range, flow proceeds to step S509, in which the corrector value calculated in step S504 is output to the intermingled corrector file.

Flow proceeds to step S510, wherein it is determined whether the end of the rasterized band obtained in step S500 has been reached. If not, flow returns to step S501, otherwise flow proceeds to step S511, in which the intermingled corrector file corresponding to the band obtained in step S500 is losslessly compressed. Suitable lossless compression techniques include run-length compression, Lempel-Ziv-Walsh compression, modified Huffman compression, and the like. Flow then continues to step 5406.

The processing of FIG. 5 creates, for each rasterized band of image data, a losslessly-compressed intermingled corrector file of corrector values and actual image data distinguished by flag characters inserted therebetween. The size of the intermingled corrector files prior to compression is roughly the same as the size of the original page of rasterized data, increased by the number of corrector values which are determined as being out of range in step S505. Accordingly, more accurate predictor algorithms result in smaller intermingled corrector files. More accurate predictor algorithms provide an additional benefit of producing intermingled corrector files having a range of values closely distributed around zero. Such files are, as described above, more effectively compressed by most lossless compression methods than files having a broader distribution.

However, as mentioned above, one potential disadvantage of a very accurate predictor algorithm is that, due to the complexity of most accurate predictor algorithms, reconstruction of image data from intermingled corrector files created using an accurate predictor algorithm is often too slow for continuous laser printing. Accordingly, the preferred embodiment uses a simple predictor algorithm.

Figure 6:
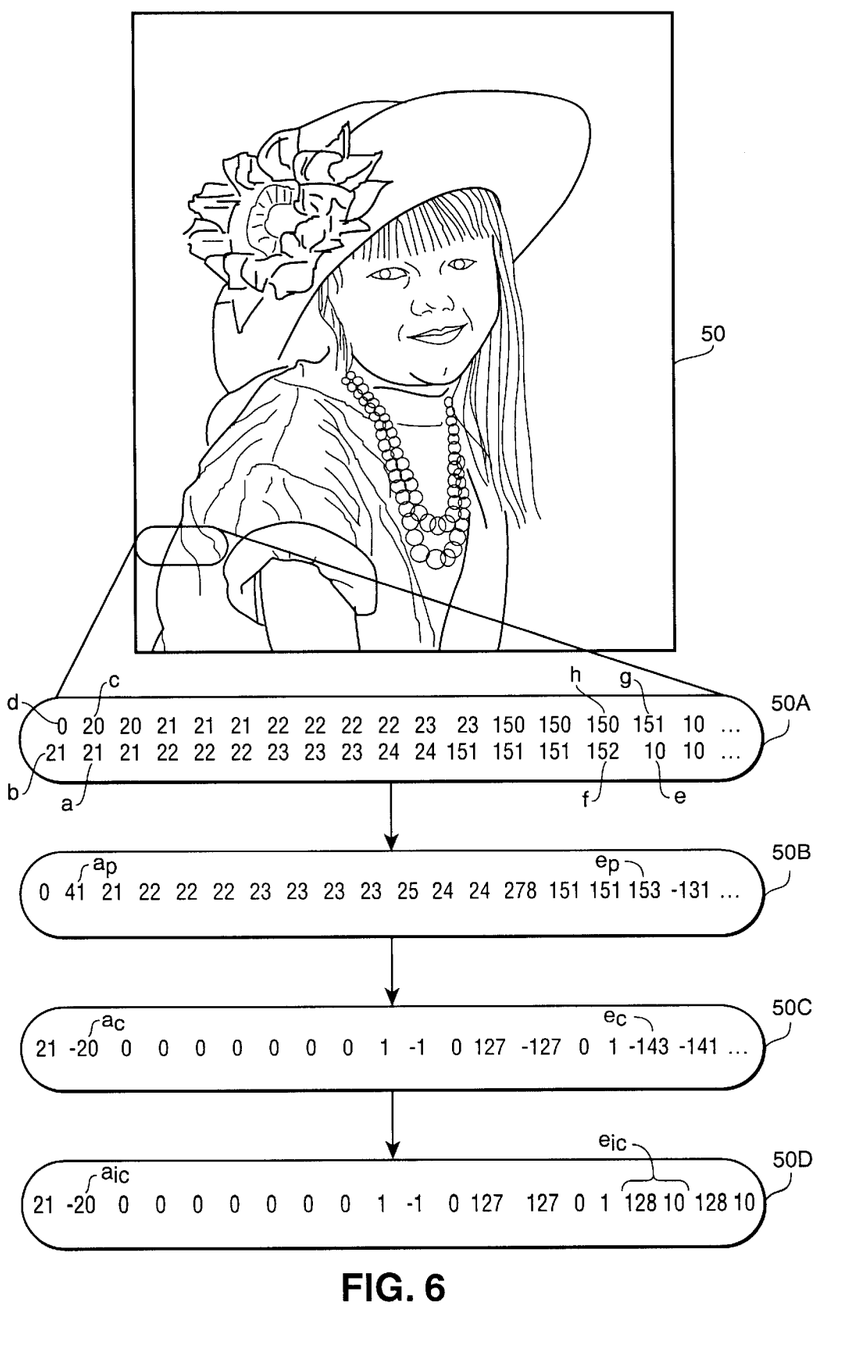
FIG. 6 is a representation of a sample multi-level gray-scale image, along with detailed views of corresponding image, predictor, corrector, and intermingled corrector files from a two-line region of the image.

An example of actual calculations according to the process of FIG. 5 will now be given in conjunction with FIG. 6. FIG. 6 contains a representational view of multi-level grayscale image 50. Exploded view 50A shows the values (on a scale of 0 to 255) of individual pixels within image 50. As shown, the pixels of image 50 are arranged in a two-dimensional raster array so as to form a rasterized bitmap, For color images, it should be understood that four bitmap "planes" similar to bitmap 50A are used to represent each of the C, M, Y and K components of a continuous-tone color image.

In the example shown in FIG. 6 and discussed below, each pixel is represented using an 8-bit byte. It should be noted that the invention may be used in conjunction with a file containing multi-level data of any particular bit length.

With respect to the FIG. 5 flow, rasterized image values 50A comprise a portion of a band obtained in step S500. Pixel "a" is obtained as a target pixel in step S501. Pixels "b", "c", "d" are obtained in step S502. A predictor value for pixel a is calculated in step S503 based on neighboring pixels b, c, and d.

According to the preferred embodiment, predictor values are calculated by summing values of a pixel directly to the left and directly above a target pixel and by subtracting a value of a pixel located directly to the upper left of the target pixel. Therefore, regarding pixel a, corresponding predictor value $a_p$ is calculated by the formula $a_p=b+c-d=21+20-0=41$. Predictor values corresponding to each target pixel located in the lower line of bitmap 50A are shown at 50B.

It should be noted that, in order to apply the above-described predictor algorithm to pixels at the leftmost or uppermost edge of an image, a virtual, or "zeroth" column and row are assumed, each of which consists entirely of zero (0) values. Pixel b, for example, is in the left-most column so the predictor algorithm assumes zero values for its left and upper left neighbors. It should also be noted that, advantageously, not all neighbors are used for predictor. Notably, the algorithm uses only those pixels that will be available (already reconstructed) by the decompression/ reconstruction hardware before target pixel a is reached.

Once predictor value $a_p$ is calculated, a corresponding corrector value is determined in step S504 using the formula: <corrector value>=<target pixel value>−<predictor value>. In the present example, the corresponding corrector value, $a_c$, results from the equation $a_c=a-a_p=21-41=-20$. Corrector values corresponding to each target pixel are shown at 50C. It should be noted that corrector values 50C are not necessarily stored and are shown in exploded view 50C only to provide a more complete explanation of FIG. 5.

Next, it is determined in step S505 whether the corresponding corrector value falls within a predetermined range. Since 8-bit signed values are used to represent corrector values, the predetermined range in the preferred embodiment is −127 to 127, inclusive. Since the corrector value for pixel a is within the predetermined range (i.e., $a_c=-20$ is between −127 and 127), the corrector value −20 is written, in step S509, to intermingled corrector file 50D as value $a_{ic}$.

In another instance, predictor value $e_p$ corresponding to rasterized image value "e" is calculated in step S502 as pixel "f" +pixel "g"−pixel "h"=152 +151−150 =153. Next, in step S504, a corresponding corrector value $e_c$ is calculated to be $e-e_p=10-153=-143$, as shown at 50C.

Since −143 is outside the predetermined range of the present example, the flag character, −128 in this example, is written to intermingled corrector file 50D. Next, in step S507, the actual value of target pixel e is also written to intermingled corrector file 50D. These two values are labeled $e_{ic}$ in FIG. 6. In step S511, once an entire band of rasterized data has been processed as described, the resulting intermingled corrector file is losslessly compressed.

According to the preferred embodiment, a compressed band of data is sent from memory 34 to interface 40 for "on the fly" decompression/reconstruction and printing.

Figure 7:
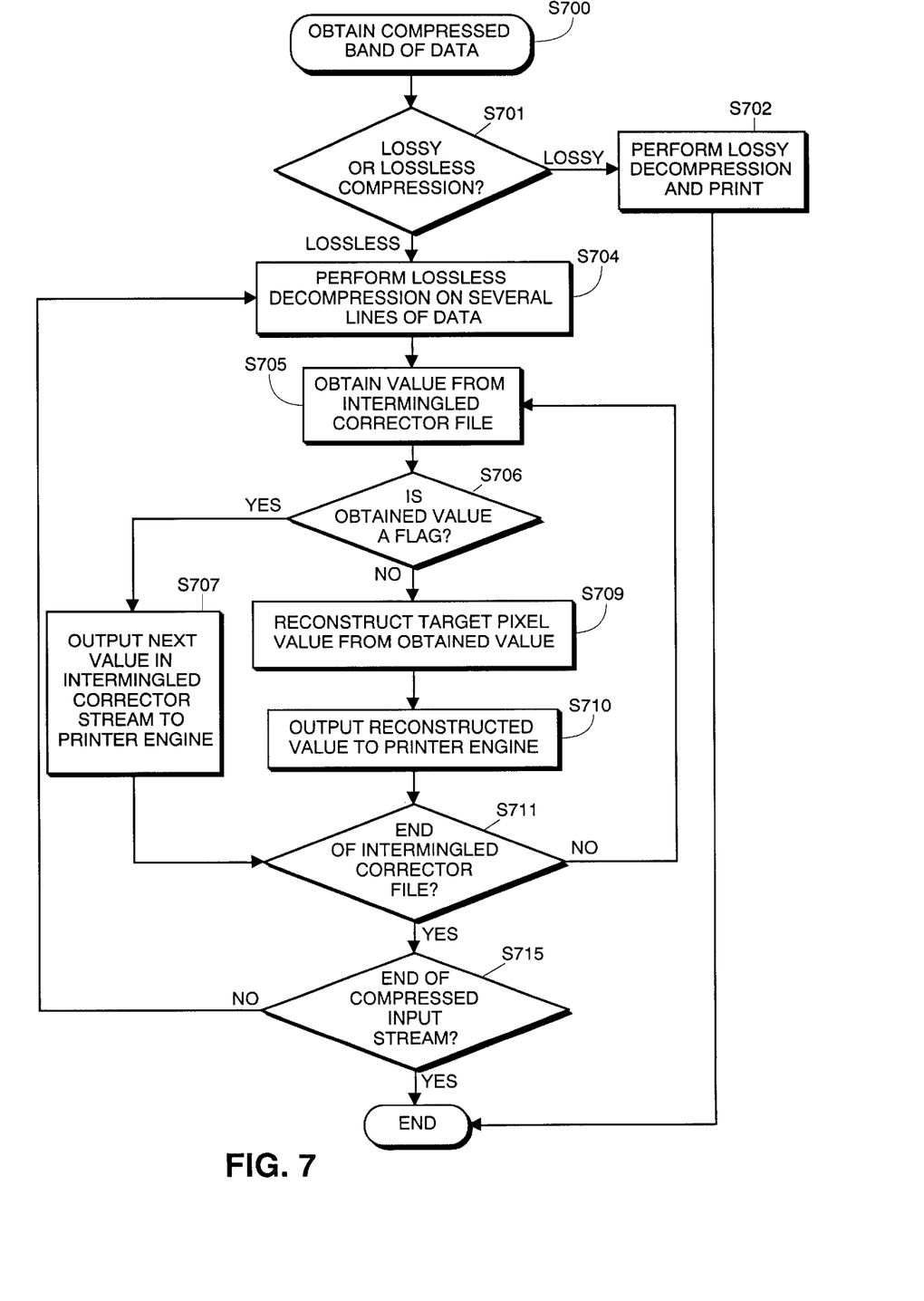
FIG. 7 is a flow diagram describing a process for decompressing compressed image data in accordance with a preferred embodiment of the present invention.

The input to step S417 consists of compressed data representing the full page. In this step, actual pixel values are reconstructed line by line in order to be fed to a printer engine. FIG. 7 is a flow diagram describing the process of step S417.

By virtue of the FIG. 7 process steps, if the original page was compressed using a lossy method, it is decompressed according to the same method. If, on the other hand, the page was losslessly compressed, then the page is losslessly decompressed into intermingled data and the original pixels of each line are reconstructed using the same predictor-corrector equation used in FIG. 5. In a case that a flag character is encountered, the flag is discarded and the value following the flag is immediately sent to be printed.

It should be noted that reconstructed pixel values of neighboring pixel values used by the predictor algorithm must be available in order to reconstruct a target pixel. These neighboring pixel values will be used in turn to reconstruct new pixels in subsequent processing, so these values must be retained until no longer needed. This retention is omitted from FIG. 7 for better clarity.

More specifically, compressed image data is obtained from memory 34 in step S700. Based on steps S400 to S414, the data may be either losslessly-compressed intermingled corrector files or lossy-compressed files of rasterized image data. Accordingly, step S701 determines whether the data has been losslessly compressed or compressed using a lossy algorithm. If a lossy algorithm has been used, flow proceeds to step S702, wherein the image data is decompressed using a lossy algorithm corresponding to the one used to compress the data in step S413 and printed.

If the incoming data in step S700 has been subjected to lossless compression, flow proceeds from step S701 to step S704, wherein the data is subjected to lossless decompression. Of course, the lossless decompression scheme must correspond to that used in step S511. As a result, an intermingled corrector file is produced. Flow then proceeds to step S705.

In step S705, a value is obtained from the intermingled corrector file. Flow proceeds to step S706, wherein it is determined whether the obtained value is a flag character. Again, the flag character searched for in step S706 is the same character used as a flag character in step S506. If the obtained value is a flag character, a next value in the intermingled corrector stream is obtained and sent to a printer engine. If the obtained value is not the flag character, flow proceeds to step S709.

In step S709, a target pixel value is reconstructed using the value obtained in step S705, the equation used to calculate the corrector values in step S504, retained values of neighboring pixels, and the same predictor algorithm as that used in step S503. In the current embodiment, pixel reconstruction is done by applying two formulas: <predictor>=<left neighboring pixel>+<upper neighbor>− <upper left neighbor>, and <target pixel>=<predictor>+ <corrector>. Next, in step S710, the reconstructed target pixel value is output to the printer engine, and is also retained for future calculation.

If the end of the corrector file has been reached, then, in step S711, flow continues to step S715. Otherwise, flow returns to step S705 to obtain a next value from the intermingled corrector file. In step S715, if the end of input compressed data has been reached, processing ends. Otherwise, control flows to step S704 in order to decompress more received data.

Steps S705 through S711 are explained below with reference to FIG. 6. Numeral 50D denotes losslessly-decompressed intermingled corrector data according to the present invention. Accordingly, in step S705, a value from file 50D is obtained, for example, value $a_{ic}$. Since value $a_{ic}$ is not the flag character −128, flow proceeds from step S706 to step S709.

In step S709, the equations described above with respect to steps S503 and S504 give: $a=a_{ic}+b+c-d=-20+21+20-0=21$. This value, 21, is output in step S710 to the printer engine.

Flow continues to step S711, wherein, because file 50D contains additional values, flow returns to step S706. Flow eventually proceeds in this manner to value −128 of values $e_{ic}$. Since −128 is a flag character, flow proceeds from step S706 to step S707. In step S707, the next value in file 50D, 10, which corresponds to actual pixel data rather than corrector data, is written sent to the printer engine. Therefore, by virtue of the FIG. 7 flow, raster data file 50A is reconstructed.

While the present invention is described above with respect to what is currently considered its preferred embodiments, it is to be understood that the invention is not limited to that described above. ro the contrary, the invention is intended to cover various modifications and equivalent arrangements included within the spirit and scope of the appended claims.

What is claimed is:

1. A method for compressing raster image data comprised of M (M>1) bands to a compression ratio of at least C':1, each band being comprised of a plurality of pixels each having a pixel value, the method comprising:
a first compressing step of compressing N ($1 \leq N < M$) bands of the raster image data using a lossless compression technique;
calculating a compression ratio for the compressed N bands of raster image data;
a first determining step of determining whether the calculated compression ratio is at least C':1, wherein C' is less than C; and
a second compressing step of compressing a remaining (M−N) bands of the raster image data using the lossless compression technique if it is determined that the calculated compression ratio is at least C':1,
wherein the remaining bands are rendered after the first compressing step and each band of raster image data is compressed before rendering a next band, and wherein, if it is determined in said first determining step that the calculated compression ratio is less than the C':1, the raster image data is compressed to a compression ratio of at least C:1 using a lossy compression technique.

2. A method according to claim 1, wherein the second compressing step comprises:
compressing X, X<(M−N), bands of the raster image data using the lossless compression technique;
calculating a second compression ratio for the compressed N+X bands of raster image data;
a second determining step of determining whether the second compression ratio is at least C":1, wherein C'<C"<C; and
compressing a remaining M−(N+X) bands using the lossless compression technique if it is determined that the second compression ratio is at least C":1.

3. A method according to claim 2, wherein, if it is determined in said second determining step that the calculated second compression ratio is less than C":1, the raster image data is compressed at a compression ratio of at least C:1 using the lossy compression technique.

4. An apparatus for compressing raster image data comprised of M (M>1) bands to a compression ratio of at least C:1, each band being comprised of a plurality of pixels each having a pixel value, comprising:
compressing means for compressing N ($1 \leq N < M$) bands of the raster image data using a lossless compression technique;
calculating means for calculating a compression ratio for the compressed N bands of raster image data; and
determining means for determining whether the calculated compression ratio is at least C':1, wherein C' is less than C,
wherein said compressing means compresses a remaining (M−N) bands of the raster image data using the lossless compression technique if it is determined that the calculated compression ratio is at least C':1,
wherein the remaining bands are rendered after the compressing means compresses the N bands and each band of raster image data is compressed before rendering a next band, and wherein, if it is determined by said determining means that the calculated compression ratio is less than the C':1, the raster image data is compressed to a compression ratio of at least C:1 using a lossy compression technique.

5. An apparatus according to claim 4, wherein said compressing means compresses X, X<(M−N), bands of the raster image data using the lossless compression technique, said calculating means calculates a second compression ratio for the compressed N+X bands of raster image data, said determining means determines whether the second compression ratio is at least C":1, wherein C'<C"<C, and said compressing means compresses a remaining M−(N+X) bands using the lossless compression technique if it is determined that the second compression ratio is at least C":1.

6. An apparatus according to claim 5, wherein, if it is determined by said determining means that the calculated second compression ratio is less than C":1, the raster image data is compressed at a compression ratio of at least C:1 using the lossy compression technique.

7. A computer-readable medium storing computer-executable process steps to compress raster image data comprised of M (M>1) bands to a compression ratio of at least C:1, each band being comprised of a plurality of pixels each having a pixel value, the process steps comprising:
a first compressing step to compress N ($1 \leq N < M$) bands of the raster image data using a lossless compression technique;
a calculating step to calculate a compression ratio for the compressed N bands of raster image data;
a first determining step to determine whether the calculated compression ratio is at least C':1, wherein C' is less than C; and.
a second compressing step to compress a remaining (M−N) bands of the raster image data using the lossless compression technique if it is determined that the calculated compression ratio is at least C':1,
wherein the remaining bands are rendered after the first compressing step and each band of raster image data is compressed before rendering a next band, and wherein, if it is determined in said first determining step that the calculated compression ratio is less than the C':1, the raster image data is compressed to a compression ratio of at least C:1 using a lossy compression technique.

8. A computer-readable medium storing computer-executable process steps according to claim 7, wherein the second compressing step comprises:
a compressing step to compress X, X<(M−N), bands of the raster image data using the lossless compression technique;
a calculating step to calculate a second compression ratio for the compressed N+X bands of raster image data;
a second determining step to determine whether the second compression ratio is at least C":1, wherein C'<C"<C; and
a compressing step to compress a remaining M−(N+X) bands using the lossless compression technique if it is determined that the second compression ratio is at least C':1.

9. A computer-readable medium storing computer-executable process steps according to claim 8, wherein, if it is determined in said second determining step that the second calculated compression ratio is less than C":1, the raster image data is compressed at a compression ratio of at least C:1 using the lossy compression technique.

10. An apparatus for compressing raster image data comprised of M (M>1) bands to a compression ratio of at least C:1, each band being comprised of a plurality of pixels each having a pixel value, comprising:

a memory storing computer-executable process steps; and a processor, wherein the processor executes the computer-executable process steps stored in the memory, the process steps comprising: 1) a first compressing step to compress N ($1 \leq N < M$) bands of the raster image data using a lossless compression technique, 2) a calculating step to calculate a compression ratio for the compressed N bands of raster image data, 3) a first determining step to determine whether the calculated compression ratio is at least C':1, wherein C' is less than C; and 4) a second compressing step to compress a remaining (M−N) bands of the raster image data using the lossless compression technique if it is determined that the calculated compression ratio is at least C':1, wherein the remaining bands are rendered after the first compressing step and each band of raster image data is compressed before rendering a next band, and wherein, if it is determined in said first determining step that the calculated compression ratio is less than the C':1, the raster image data is compressed to a compression ratio of at least C:1 using a lossy compression technique.

11. An apparatus according to claim 10, wherein the step of compressing a remaining (M−N) bands comprises:

a compressing step to compress X, X<(M−N), bands of the raster image data using the lossless compression technique;

a calculating step to calculate a second compression ratio for the compressed N+X bands of raster image data;

a second determining step to determine whether the second compression ratio is at least C":1, wherein C'<C"<C; and a compressing step to compress a remaining M−(N+X) bands using the lossless compression technique if it is determined that the second compression ratio is at least C":1.

12. An apparatus according to claim 11, wherein, if it is determined in said second determining step that the calculated second compression ratio is less than C":1, the raster image data is compressed at a compression ratio of at least C:1 using the lossy compression technique.

* * * * *

UNITED STATES PATENT AND TRADEMARK OFFICE
CERTIFICATE OF CORRECTION

PATENT NO. : 6,337,747 B1
DATED : January 8, 2002
INVENTOR(S) : Hanan Rosenthal

It is certified that error appears in the above-identified patent and that said Letters Patent is hereby corrected as shown below:

Column 2,
Line 45, "or" should read -- of --.

Column 3,
Line 47, "that:" should read -- that --.

Column 9,
Line 8, "is;" should read -- is: --.

Column 12,
Line 66, "ro" should read -- To --.

Signed and Sealed this

Fifteenth Day of July, 2003

JAMES E. ROGAN
*Director of the United States Patent and Trademark Office*